United States Patent
Nichols et al.

(10) Patent No.: US 10,337,907 B2
(45) Date of Patent: Jul. 2, 2019

(54) POSITIONABLE MATERIAL VESSEL WITH LOAD CELL

(71) Applicant: DRAGON FAB-TECH, LLC, Beaumont, TX (US)

(72) Inventors: Blake Alan Nichols, Longview, TX (US); Colemon Eugene Dean, Casper, WY (US); Camdon John DePaolo, Casper, WY (US)

(73) Assignee: DRAGON FAB-TECH, LLC, Beaumont, TX (US)

( * ) Notice: Subject to any disclaimer, the term of this patent is extended or adjusted under 35 U.S.C. 154(b) by 194 days.

(21) Appl. No.: 15/210,655

(22) Filed: Jul. 14, 2016

(65) Prior Publication Data

US 2017/0016759 A1    Jan. 19, 2017

Related U.S. Application Data

(60) Provisional application No. 62/192,554, filed on Jul. 14, 2015.

(51) Int. Cl.
*G01G 19/08*    (2006.01)
*G01G 19/12*    (2006.01)
*G01G 17/04*    (2006.01)

(52) U.S. Cl.
CPC .............. *G01G 19/12* (2013.01); *G01G 17/04* (2013.01); *G01G 19/08* (2013.01)

(58) Field of Classification Search
CPC .......................... G01G 17/04; G01G 19/08–12
See application file for complete search history.

(56) References Cited

U.S. PATENT DOCUMENTS

| | | | | |
|---|---|---|---|---|
| 3,971,451 A | * | 7/1976 | Norberg ................. | G01G 19/08 177/1 |
| 5,303,946 A | * | 4/1994 | Youmans ............... | B60G 3/185 280/405.1 |
| 5,369,222 A | * | 11/1994 | Strelioff ................. | G01G 19/10 177/136 |
| 5,393,936 A | * | 2/1995 | Tyhy ...................... | G01G 19/12 177/138 |
| 5,416,706 A | * | 5/1995 | Hagenbuch ............ | G01G 19/08 177/136 |
| 5,773,768 A | * | 6/1998 | Nuyts ..................... | G01G 19/08 177/136 |
| 6,587,041 B1 | * | 7/2003 | Brown, Jr. ............ | B62D 53/125 340/431 |

(Continued)

OTHER PUBLICATIONS

Definition of hydraulic load cell, downloaded from Noshok website Jan. 11, 2019.*

*Primary Examiner* — Natalie Huls
(74) *Attorney, Agent, or Firm* — Adolph Locklar

(57) ABSTRACT

A material containment and delivery system includes a base assembly and a vessel comprising a housing configured to contain a material. In embodiments, the base is a free standing assembly, is anchored to the ground or a structure, is configured to be coupled to a vehicle, and/or the like. The vessel may be rotatably coupled to the base assembly near the second end, and may include a positioning assembly configured to move the vessel from a first position to a second position. The system may further include a load cell assembly, coupled to the positioning assembly and configured to determine a weight of material within the vessel.

12 Claims, 18 Drawing Sheets

(56) References Cited

U.S. PATENT DOCUMENTS

| | | | |
|---|---|---|---|
| 7,285,735 B1* | 10/2007 | Elliott | B60G 17/0155 177/1 |
| 8,716,609 B2* | 5/2014 | Pangrazio | G01G 19/08 177/136 |
| 8,840,189 B2* | 9/2014 | Minoshima | B60P 1/162 298/22 R |
| 9,534,948 B2* | 1/2017 | Lustenberger | G01G 19/12 |
| 2002/0062997 A1* | 5/2002 | Moore | G01G 19/083 177/136 |
| 2004/0104596 A1* | 6/2004 | Bender | G01G 19/12 296/183.2 |
| 2005/0167165 A1* | 8/2005 | Takeda | B60G 5/04 177/136 |
| 2010/0251831 A1* | 10/2010 | Hose von Wolfframsdorff | G01G 3/14 73/862.045 |
| 2014/0309850 A1* | 10/2014 | Gabibulayev | G01G 19/08 701/33.7 |
| 2016/0202111 A1* | 7/2016 | Fahey | B65D 90/143 177/141 |
| 2017/0191865 A1* | 7/2017 | Kvist | G01G 19/08 |
| 2017/0247068 A1* | 8/2017 | Ratgen | B62D 49/0635 |
| 2018/0111536 A1* | 4/2018 | Fushiki | B60P 1/16 |

* cited by examiner

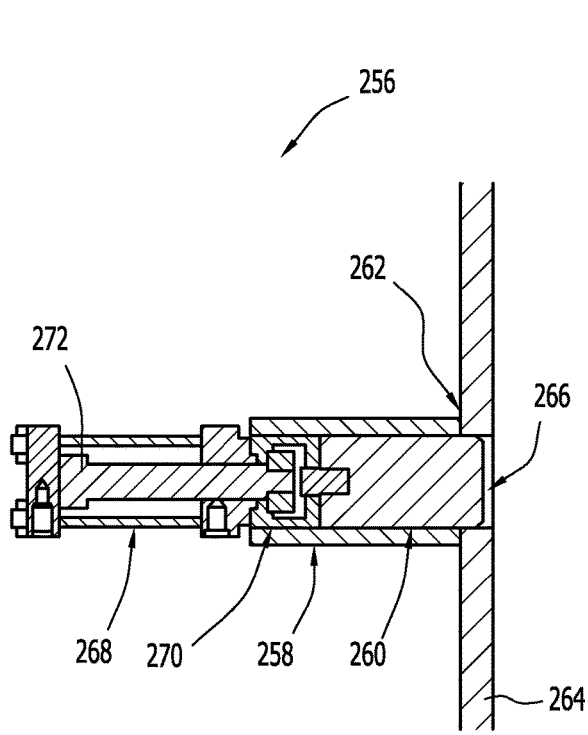
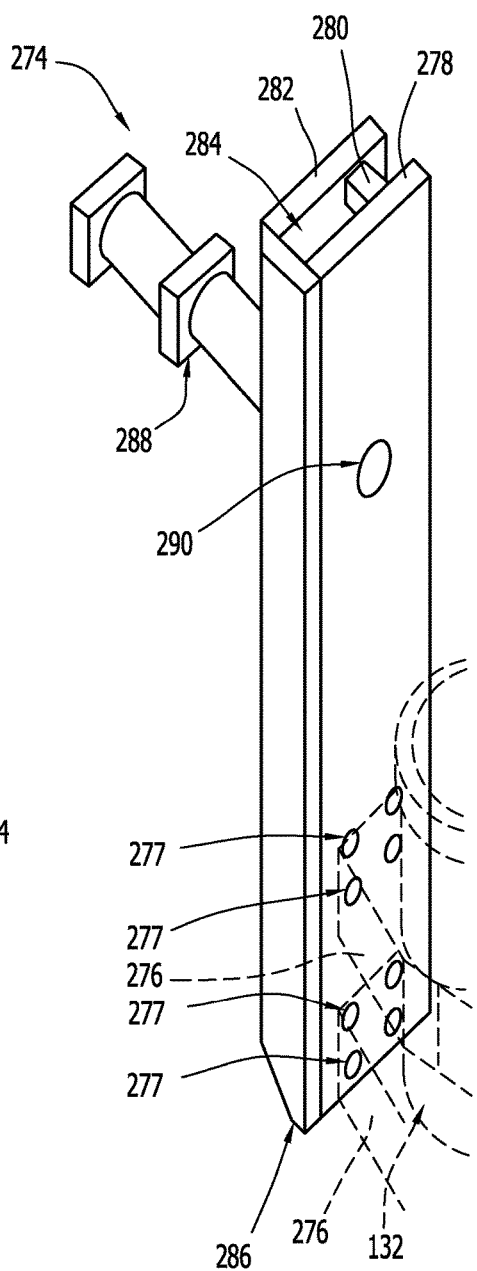
FIG.6C
FIG.6D

POSITIONABLE MATERIAL VESSEL WITH LOAD CELL

Load cells are often used to measure the weight of a vessel such as, for example, by placing a load cell under one of three supports of the vessel, where the other two supports are pivotably coupled to the vessel. For example, a load cell may be placed under a hydraulic cylinder that is configured to facilitate positioning of a material containment and/or delivery vessel from a substantially horizontal position to a substantially vertical position. Ambient temperature changes in the hydraulic fluid may cause actuations of the hydraulic cylinder, thereby influencing the measurement of the weight of the vessel by the load cell. Further, these actuations may cause instability in the structure supporting the vessel.

It is with respect to these and other considerations that embodiments have been made. Also, although relatively specific problems have been discussed, it should be understood that the embodiments should not be limited to solving the specific problems identified in the introduction.

SUMMARY

In embodiments, a material containment and delivery system includes a base assembly and a vessel comprising a housing configured to contain a material. In embodiments, the base assembly may be a free standing assembly, may be anchored to the ground or a structure, may be configured to be coupled to a vehicle, and/or the like. The housing may include a first end, a second end, and a lateral axis extending from the first end to the second end. The vessel may be rotatably coupled to the base assembly near the second end, and the system may include a positioning assembly configured to move the vessel from a first position to a second position, the first position including a position in which the lateral axis is substantially parallel to a lateral axis of the base assembly. The system may further include a load cell assembly, coupled to the positioning assembly and configured to determine a weight of material within the vessel.

In aspects of the technology, by using the hydraulic cylinder to lift the load and then decoupling the hydraulic part of the cylinder from the load path, more accurate measurements of the weight of the vessel and fluid may be possible by mitigating the dimension displacements that caused this method to be unacceptable before.

In embodiment of the technology, a material containment and delivery system comprises a base assembly; a vessel comprising a housing configured to contain a material, the housing comprising a first end, a second end, and a lateral axis extending from the first end to the second end, wherein the vessel is coupled to the base assembly. Additionally, in aspects, a positioning assembly is configured to move the vessel from a first position to a second position, and a load cell assembly is coupled to the positioning assembly. Further, the load cell assembly is configured to measure a weight of material within the vessel.

In additional/alternative aspects of the technology, the base assembly is configured to be coupled to a vehicle.

In additional/alternative aspects of the technology, the base assembly is coupled to a towable trailer.

In additional/alternative aspects of the technology, the positioning assembly comprises a hydraulic cylinder having a barrel and at least one piston slidably disposed within the barrel.

In additional/alternative aspects of the technology, the system includes at least one piston with an inner piston having a first end slidably disposed within an intermediate piston, and includes a second end pivotably coupled to a connection assembly disposed on the vessel housing.

In additional/alternative aspects of the technology, the system includes the positioning assembly with a locking pin assembly coupled to the barrel, the locking pin assembly configured to releasably engage a locking member disposed on the vessel housing.

In additional/alternative aspects of the technology, the positioning assembly is configured to rotate or pivot the vessel from the first position to the second position.

In additional/alternative aspects of the technology, the first position comprises a position in which the lateral axis of the vessel is substantially parallel to a lateral axis of the base assembly.

In additional/alternative aspects of the technology, the lateral axis is substantially parallel to the lateral axis of the base assembly by being between from parallel to 10 degrees from parallel.

In additional/alternative aspects of the technology, the second position comprises a position in which the lateral axis of the vessel intersects a lateral axis of the base assembly.

In additional/alternative aspects of the technology, the second position comprises a position in which the lateral axis of the vessel is substantially perpendicular to a lateral axis of the base assembly.

In additional/alternative aspects of the technology, the lateral axis is substantially perpendicular to the lateral axis of the base assembly by being between from perpendicular to 10 degrees from perpendicular.

In additional/alternative aspects of the technology, the system includes, the vessel is coupled to the base assembly near the second end.

In additional/alternative aspects of the technology, the vessel is coupled to the base assembly near the center of the vessel.

In additional/alternative aspects of the technology, a method of operating a material containment and delivery system is provided. The method may be performed using a vessel having a housing configured to contain a material, the housing comprising a first end, a second end, and a lateral axis extending from the first end to the second end, wherein the vessel is coupled to a base assembly. The method may include moving, using a positioning assembly, the vessel from a first position to a second position.

In additional/alternative aspects of the technology, the base assembly is configured to be coupled to a vehicle.

In additional/alternative aspects of the technology, the base assembly is coupled to a towable trailer.

In additional/alternative aspects of the technology, the positioning assembly comprises a hydraulic cylinder having a barrel and at least one piston slidably disposed within the barrel.

In an additional/alternative aspects of the technology, the at least one piston comprises an inner piston having a first end slidably disposed within an intermediate piston, and a second end pivotably coupled to a connection assembly disposed on the vessel housing.

In additional/alternative aspects of the technology, the positioning assembly comprises a locking pin assembly coupled to the barrel, the locking pin assembly configured to releasably engage a locking member disposed on the vessel housing.

In additional/alternative aspects of the technology, the positioning assembly is configured to rotate or pivot the vessel from the first position to the second position.

In additional/alternative aspects of the technology, the first position comprises a position in which the lateral axis of the vessel is substantially parallel to a lateral axis of the base assembly.

In additional/alternative aspects of the technology, the lateral axis is substantially parallel to the lateral axis of the base assembly by being between from parallel to 10 degrees from parallel.

In additional/alternative aspects of the technology the second position comprises a position in which the lateral axis of the vessel intersects a lateral axis of the base assembly.

In additional/alternative aspects of the technology, the second position comprises a position in which the lateral axis of the vessel is substantially perpendicular to a lateral axis of the base assembly.

In additional/alternative aspects of the technology, the lateral axis is substantially perpendicular to the lateral axis of the base assembly by being between from perpendicular to 10 degrees from perpendicular.

In additional/alternative aspects of the technology, the vessel is coupled to the base assembly near the second end.

In additional/alternative aspects of the technology, the vessel is coupled to the base assembly near the center of the vessel.

In additional/alternative aspects of the technology, a material containment and delivery system includes a base assembly, a vessel that includes a housing configured to contain a material. The housing includes a first end, a second end, and a lateral axis extending from the first end to the second end. The vessel is coupled to the base assembly. The delivery system further includes a positioning assembly configured to move the vessel from a first position to a second position. The delivery system may include a load cell coupled to either the positioning assembly or a support leg. The load cell is configured to measure a weight of material within the vessel.

In additional/alternative aspects of the technology, the base assembly is configured to be coupled to a vehicle.

In additional/alternative aspects of the technology, the base assembly is coupled to a towable trailer.

In additional/alternative aspects of the technology, the positioning assembly comprises a hydraulic cylinder having a barrel and at least one piston slidably disposed within the barrel.

In additional/alternative aspects of the technology, the at least one piston comprising an inner piston having a first end slidably disposed within an intermediate piston, and a second end pivotably coupled to a connection assembly disposed on the vessel housing.

In additional/alternative aspects of the technology, the positioning assembly further comprising a locking pin assembly coupled to the barrel, the locking pin assembly configured to releasably engage a locking member disposed on the vessel housing.

In additional/alternative aspects of the technology, the positioning assembly is configured to rotate or pivot the vessel from the first position to the second position.

In additional/alternative aspects of the technology, wherein the first position comprises a position in which the lateral axis of the vessel is substantially parallel to a lateral axis of the base assembly.

In additional/alternative aspects of the technology, wherein the lateral axis is substantially parallel to the lateral axis of the base assembly by being between from parallel to 10 degrees from parallel.

In additional/alternative aspects of the technology, the system the second position comprises a position in which the lateral axis of the vessel intersects a lateral axis of the base assembly.

In additional/alternative aspects of the technology, the second position comprises a position in which the lateral axis of the vessel is substantially perpendicular to a lateral axis of the base assembly.

In additional/alternative aspects of the technology, the lateral axis is substantially perpendicular to the lateral axis of the base assembly by being between from perpendicular to 10 degrees from perpendicular.

In additional/alternative aspects of the technology, the vessel is coupled to the base assembly near the second end.

In additional/alternative aspects of the technology, the vessel is coupled to the base assembly near the center of the vessel.

BRIEF DESCRIPTION OF THE DRAWINGS

FIG. 6C is a cross-sectional side view of portions of a pin locking assembly of an illustrative material and containment system, in accordance with embodiments of the disclosure;

FIG. 6D is a perspective side view of a pin locking assembly of an illustrative material and containment system, in accordance with embodiments of the disclosure;

Figure 1A:
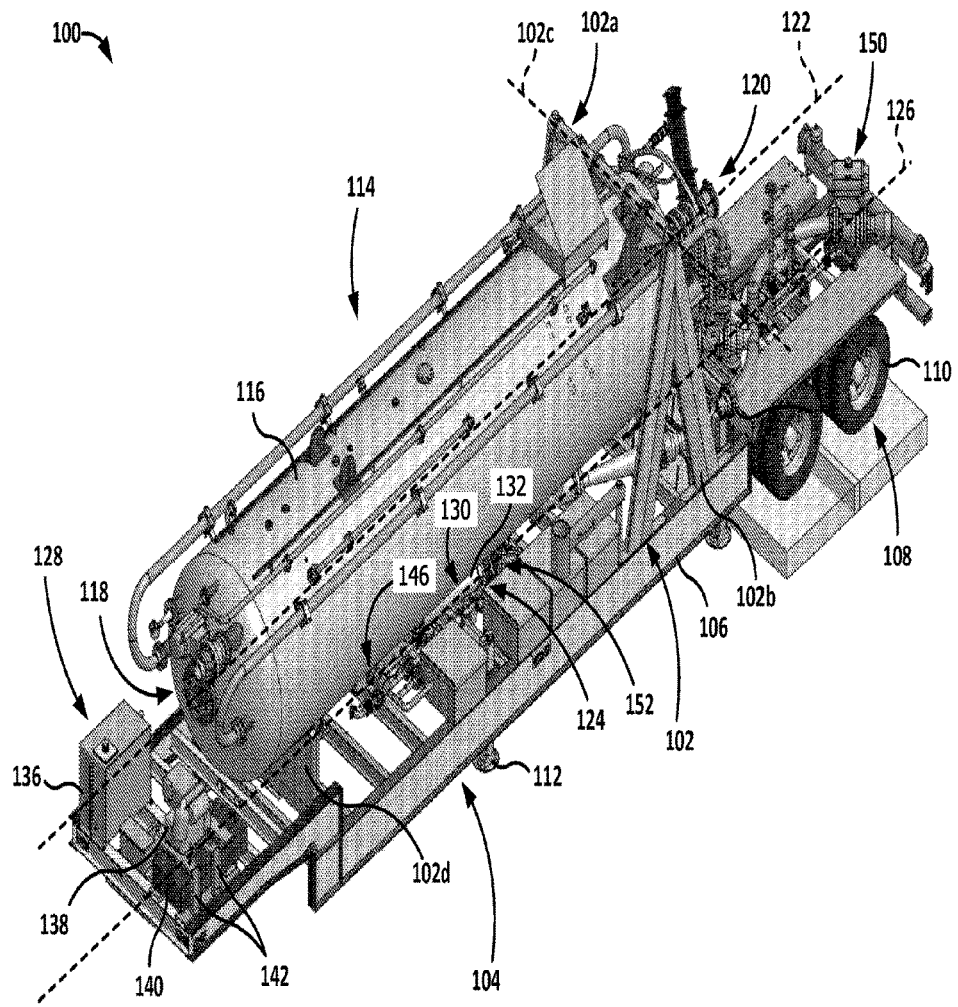
FIG. 1A is a perspective view of an illustrative material containment and delivery system, in accordance with embodiments of the disclosure.

While the subject matter disclosed herein is amenable to various modifications and alternative forms, specific embodiments have been shown by way of example in the drawings and are described in detail below. The disclosed subject matter, however, is not limited to the particular embodiments described. On the contrary, the disclosure is intended to cover all modifications, equivalents, and alternatives falling within the ambit of the subject matter disclosed herein, as defined by the appended claims.

DETAILED DESCRIPTION

Embodiments include a system that facilitates moving a vessel such as a material containment and delivery vessel from a first position to a second position, and measures the weight of the vessel or calculates a weight of the vessel based on measured force. Movement of the vessel from the first position may be accomplished using a telescoping shaft. As an example, in the case of a vessel that is used as a blender for preparing fracturing fluid made of proppant such as sand and carbon dioxide (CO2), embodiments of the disclosed subject matter facilitate mechanically pinning the barrel of a hydraulic cylinder while dumping sand and liquid CO2. In embodiments, pinning the hydraulic cylinder to the vessel may be, or include, a safety lock that prevents the vessel from moving out of the second position. As an example, embodiments of the disclosed subject matter include a trailer-mounted ASME code vessel configured to be transported horizontally to a well-site. The vessel may be rotated to the vertical and filled with proppant and liquid CO2. Using a load cell, the weight of the proppant and CO2 may be monitored (e.g., in "real-time" as the fluid is moved from the vessel). Other embodiments may include vessels that are not trailer-mounted, but instead, are mounted on a stationary base assembly.

As shown, for example, in FIG. 1A, the system 100 includes a base assembly 102. In embodiments, the base assembly 102 may be a stand-alone base, attached to a vehicle, or integrated into a vehicle 104. The vehicle 104 may include, for example, a towable trailer, a truck, a tractor, and/or the like. As shown, the vehicle 104 may include a frame 106 and a motion system 108 such as, for example, one or more wheels 110, a tread system, and/or the like. The vehicle 104 may also include one or more stabilization legs 112 coupled to the frame 106 and configured to facilitate stabilization of the vehicle 104 when it is stationary.

A vessel 114 is coupled, for example, rotatably or pivotably coupled to the base assembly 102, and includes a housing 116 configured to contain a material such as, for example, a liquid, a gas, a solid, a combination (e.g., a mixture) of liquids, gasses, solids, and/or the like. The housing 116 includes a first end 118, a second end 120, and a lateral axis 122 extending from the first end 118 to the second end 120. As shown in FIG. 1A, the vessel 114 may be rotatably or pivotably coupled to the base assembly 102 near the second end 120 of the vessel 114. For example, a pivot connection assembly 102a may be configured to couple the vessel 114 to an A-frame assembly 102b (or, in embodiments, another type of assembly configured to rotatably couple a vessel to a base assembly) such that the vessel 114 is configured to rotate about an axis of rotation 102c. The base assembly 102 also may include, for example, a supporting structure 102d configured to support the vessel 114 near the front end 118 when the vessel 114 is in a first position, in which the lateral axis 122 of the vessel 114 is substantially parallel to a lateral axis 126 of the base assembly 102.

Figure 1B:
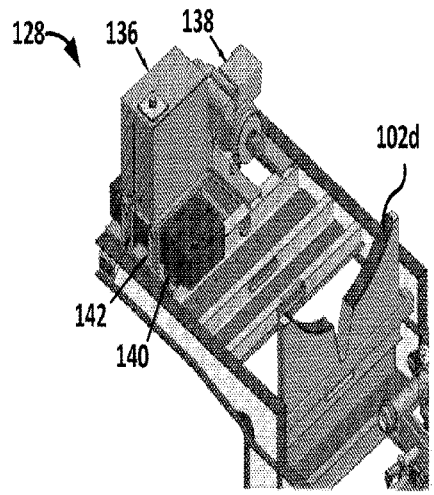
FIG. 1B is a perspective view of a portion of the illustrative material and containment system depicted in FIG. 1A, in accordance with embodiments of the disclosure.
Figure 1C:
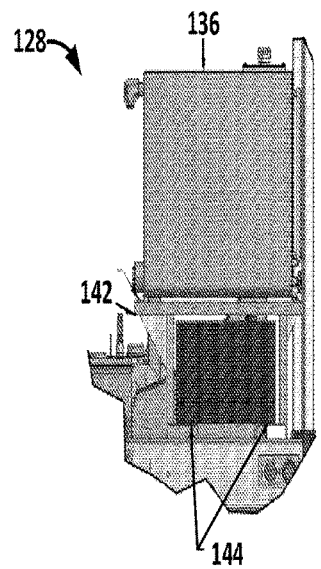
FIG. 1C is a side view of a portion of the illustrative material and containment system depicted in FIG. 1A, in accordance with embodiments of the disclosure.
Figure 1D:
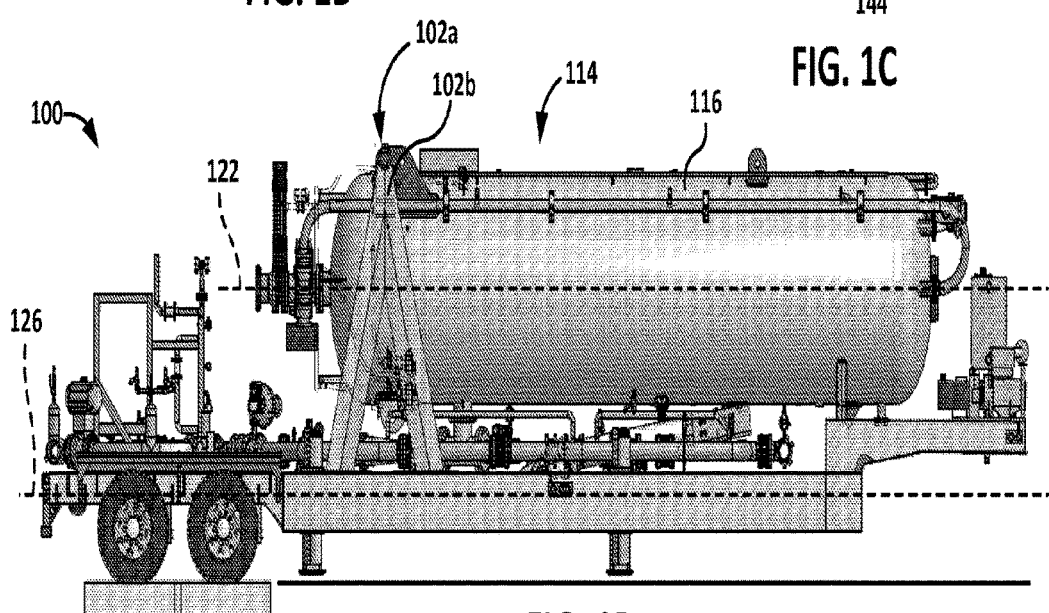
FIG. 1D is a side view of the illustrative material and containment system depicted in FIG. 1A, in accordance with embodiments of the disclosure.

A positioning assembly 124 is configured to move the vessel 114 from the first position to a second position (in which the lateral axis 122 of the vessel 114 intersects the lateral axis 126 of the base assembly 102), as discussed in further detail below. As shown in FIG. 1A, the positioning assembly 124 may include a hydraulic system 128. The hydraulic system 128 includes a hydraulic cylinder 130 that includes a barrel 132 and at least one piston (e.g., piston 134a, 134b, 134c, etc., depicted in FIG. 2) slidably disposed within the barrel 132. According to embodiments, the hydraulic cylinder 130 may be a multi-stage hydraulic cylinder that includes a number of nested pistons slidably disposed within the barrel 132. The hydraulic cylinder may be driven, using a hydraulic tank 136, for example, by a diesel engine/pump drive 138, fed by a diesel tank 140. An alternative embodiment of the arrangement of the hydraulic tank 136, diesel engine/pump drive 138, and diesel tank 140 is depicted in FIGS. 1B and 1C. As shown in FIGS. 1A-1C, the hydraulic tank 136 may be coupled to the base assembly 102 via a mounting mechanism 142, which may include, for example, diesel tank stiffeners 144 mounted thereon. In embodiments, any number of different arrangements of these components and/or other components may be implemented.

The positioning assembly 124 also includes a locking means such as locking pin assembly 146 coupled to the barrel 132 at or near a first end 132a of the barrel 132. In embodiments, the locking pin assembly 146 may be configured to releasably engage a locking feature or member 148 disposed on the vessel housing 116 (as depicted, e.g., in FIGS. 11A and 11B), thereby locking the vessel 114 in the second position, as discussed in more detail below.

As is further shown in FIG. 1A, the system 100 may include a material transport system 150 configured to transport material throughout one or more portions of the system 100. For example, the vessel housing 116 may be configured to supply a liquid, gas, and/or proppant to the material transport system 150. In embodiments, the material transport system 150 may include any number of conduits (e.g., pipes), valves, pumps, and/or the like. For example, the example material transport system 150 depicted in FIG. 1A is configured to facilitate blending liquid $CO_2$ with proppant sand to create a fracturing fluid for delivery to fracturing pumps, which pump the fracturing fluid downhole, where it is used to fracture a hydrocarbon-containing formation (e.g., oil shale).

The system 100 is shown including a load cell assembly 152. The load cell assembly 152 may be, for example, coupled to the positioning assembly 124, and disposed between the positioning assembly 124 and the base assembly 102. In embodiments, the system 100 may include one load cell assembly (as shown in the Figures), and in other embodiments, the system 100 may include more than one load cell assembly. That is, for example, a load cell assembly may be disposed under each point at which the vessel 114 is supported. The load cell assembly 152 may be configured to determine a weight of material within the vessel 114. In this manner, the load cell assembly 152 may facilitate monitoring the flow rates of material exiting from the vessel 114. Other sensors and/or techniques may be used to facilitate the determination of material flow such as, for example, mass flow sensors, densitometers, and/or the like. (The term determine is intended to mean to determine, measure, estimate, approximate and/or the like. The same is intended for the term determination.)

According to various embodiments, the vessel 114 is configured to be moved, for example rotated, into a second position, in which the lateral axis 122 of the vessel 114 intersects the lateral axis 126 of the base assembly 102. In embodiments, when the vessel 114 is in the second position, the lateral axis 122 of the vessel is substantially perpendicular to (e.g., perpendicular to, or within 5 degrees of being perpendicular to, or even within 10 degrees of being perpendicular to) the lateral axis 126 of the base assembly 102. In the example of the blending vessel, operating the blender in an orientation that is nearly vertical (e.g., in which the lateral axis 126 of the base assembly is substantially horizontal—e.g., substantially parallel to the surface of the earth—and the lateral axis 122 of the vessel is substantially perpendicular to the lateral axis 126 of the base assembly 102) may facilitate efficient delivery of the proppant sand. According to embodiments, when the vessel 114 is in the second position, the lateral axis 122 of the vessel may intersect the lateral axis 126 of the base assembly 102 at any angle, and the vessel may be weighed at any angle, so long as the hydraulic cylinder is locked out of the load path such that the weight of the vessel may be determined without the potential influence of temperature changes to the hydraulic.

Additionally, to facilitate more accurate measurement using the load cell assembly 152, embodiments of the system 100 are configured such that, when the vessel 114 is in the second position, the potential influences of expansion and/or contraction of hydraulic fluid within the hydraulic cylinder 130 may be mitigated. Embodiments include techniques and mechanisms for releasably securing the vessel 114 to the barrel 132 when the vessel is in the second position. For example, according to embodiments, the locking pin assembly 146 is configured to releasably secure the vessel 114 to the barrel 132. In this manner, the vessel 114 can be fixed in the second position and, since the load cell assembly 152 is fixedly coupled (e.g., bolted) to a second end 132b of the barrel 132, the mechanical connection between the vessel 114 and the load cell assembly 152 may be substantially free of any potential influence from the hydraulic fluid. Additionally/alternatively, the influences may be mitigated.

Figure 2:
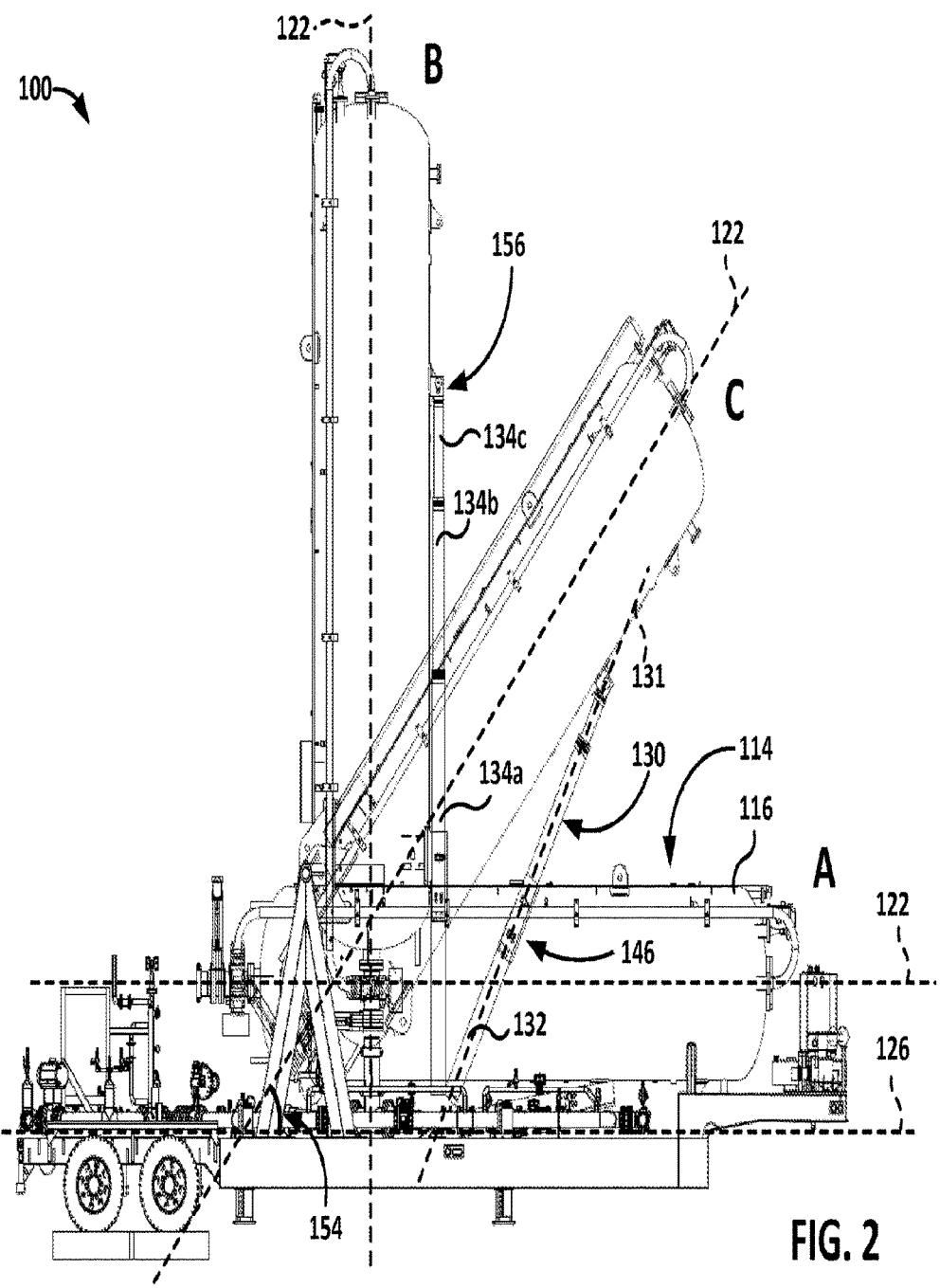
FIG. 2 is a side schematic view of a portion of the illustrative material and containment system depicted in FIG. 1A, in accordance with embodiments of the disclosure.
Figure 3A:
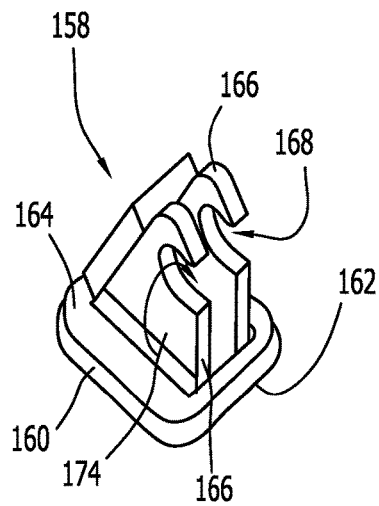
FIGS. 3A and 3B are perspective views of portions of a connection assembly of the illustrative material and containment system depicted in FIG. 1A, in accordance with embodiments of the disclosure.
Figure 3B:
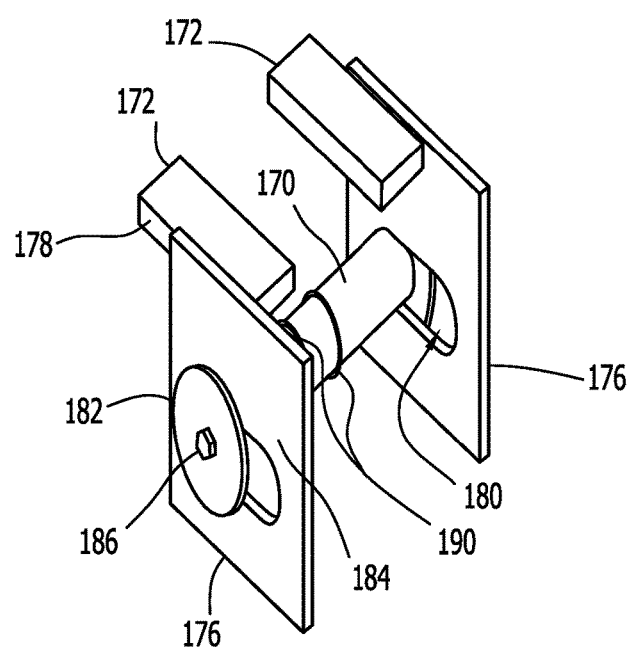
Figure 4A:
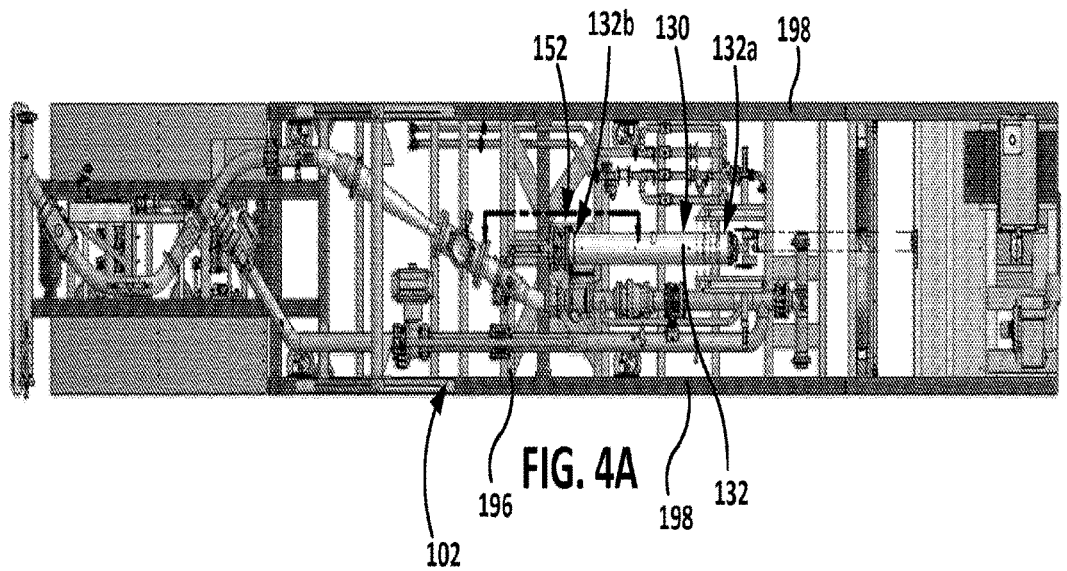
FIG. 4A is a top view of the illustrative material and containment system depicted in FIG. 1A, showing coupling of a hydraulic cylinder to a load cell assembly and a base assembly, in accordance with embodiments of the disclosure.
Figure 4B:
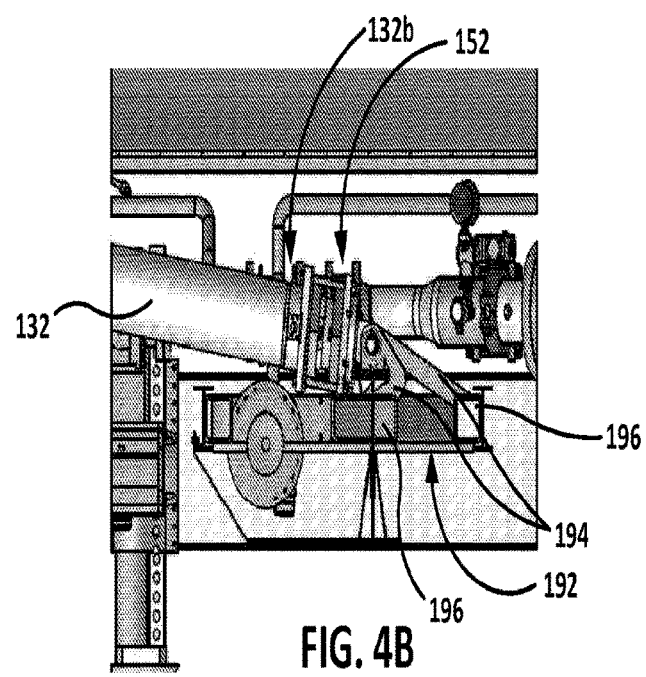
FIG. 4B is a side view of the illustrative material and containment system depicted in FIG. 4A, showing coupling of a hydraulic cylinder to a load cell assembly and a base assembly, in accordance with embodiments of the disclosure.

FIG. 2 is a schematic diagram depicting an illustrative positioning of the vessel 114 in accordance with embodiments of the disclosure. As shown, the vessel may be rotated between a first position A and a second position B, by way of an intermediate position C. In the first position A, the lateral axis 122 of the vessel is substantially parallel to (e.g., parallel to, or within 5 degrees of being parallel to, or even within 10 degrees of being parallel to) the lateral axis 126 of the base assembly 102. According to embodiments, the lateral axes 122 and 126 may have any number of different relationships, angles of intersection, and/or the like, when the vessel is in the first position A. In the intermediate position C, the lateral axis 122 of the vessel intersects the lateral axis 126 of the base assembly 102 such that an acute angle 154 is formed between the two axes 122 and 126. In the second position B, the lateral axis 122 of the vessel is substantially perpendicular to (e.g., perpendicular to, or within 5 degrees of being perpendicular to, or even within 10 degrees of being perpendicular to) the lateral axis 126 of the base assembly 102. In embodiments, a substantially perpendicular second position B may not be desired, in which case the second position B may be similar to the intermediate position C or may be a position in which the angle 154 is obtuse, rather than acute.

As shown, the hydraulic cylinder 130 may be a multi-stage, telescoping hydraulic cylinder, and may include a first piston 134a slidably disposed within the hydraulic cylinder 130, a second (e.g. intermediate) piston 134b slidably disposed within the first piston 134a, and a third (e.g., inner) piston 134c slidably disposed within the second piston 134b. The third piston 134c is pivotably coupled, at one end, via a connection assembly 156, to the vessel housing 116.

As shown in FIGS. 3A, 3B, 7B, 8B, 9B, 9C, 10B, and 10C the connection assembly 156 includes a stop block 158 having a base 160. The base 160 includes a first face 162 configured to be secured to the housing 116 of the vessel 114, and a second face 164 arranged opposite the first face 162. A pair of plates 166 extend outward from the second face 164 of the base 160 and include a pair of notches 168 configured to receive a rod 170, which is configured to engage the stop block 158 and exert force on the stop block 158 as the hydraulic cylinder 130 rotates the vessel 114. A pair of mounting bars 172 are secured to the second face 164 of the base, adjacent opposed corresponding outside faces 174 of the plates 166. A pair of retaining plates 176 is secured to opposed corresponding outside faces 178 of the mounting bars 172, and to the second face 164 of the base 160. The rod 170 extends between the retaining plates 176 and through an elongated notch 180 disposed in each retaining plate 176. A guide plate 182 is secured to each end of the rod 170, adjacent an outside surface 184 of the retaining plate 176, using a bolt 186 such that the rod 170 is moveably retained between the retaining plates 176. An eye 188 disposed at the end of the inner piston 134c is configured to receive the rod 170, and is restrained from sliding along the rod 170 by a pair of snap rings 190.

FIGS. 4A, 4B, 5A, and 5B illustrate the coupling of the hydraulic cylinder 130 and load cell assembly 152 to the base assembly 102, in accordance with embodiments of the subject matter disclosed herein. As shown, the load cell assembly 152 is secured to the second end 132b of the barrel 132 of the hydraulic cylinder 130 and is pivotably coupled to a load cell mounting assembly 192. According to embodiments, the load cell mounting assembly 192 includes one or more linkages 194 that are secured, at one end, to frame supports 196 extending between side panels 198 of the base assembly, and are pivotably attached, at the opposite end, to the load cell assembly 152.

Figure 5A:
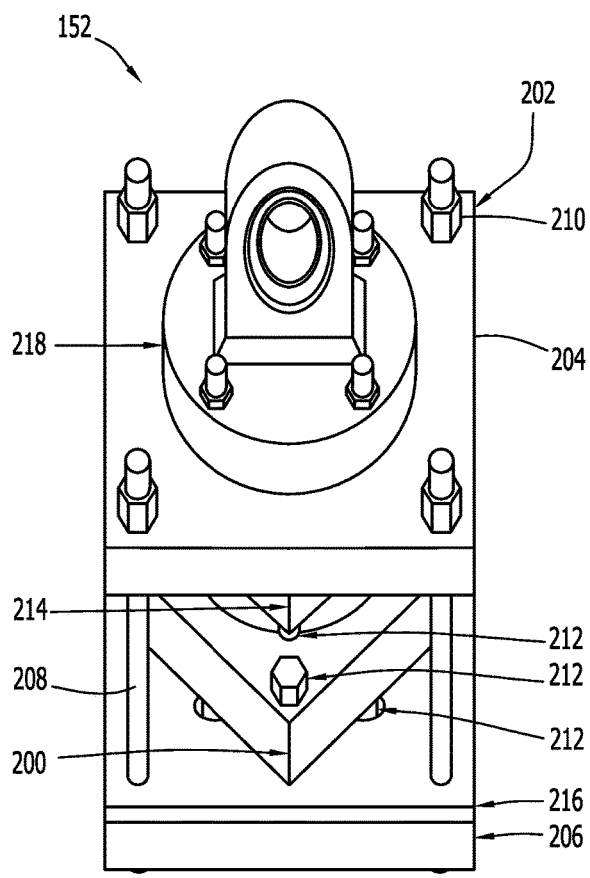
FIG. 5A is a perspective side view of a load cell assembly of the illustrative material and containment system depicted in FIG. 1A, in accordance with embodiments of the disclosure.
Figure 5B:
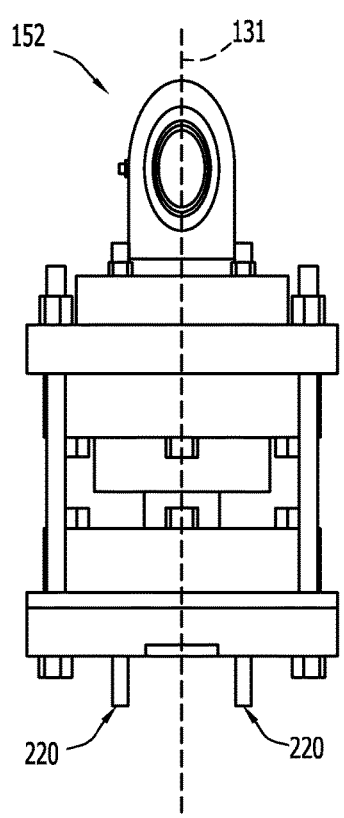
FIG. 5B is a side view of a load cell assembly of the illustrative material and containment system depicted in FIG. 1A, in accordance with embodiments of the disclosure.

As shown in FIGS. 5A and 5B, the load cell assembly 152 includes a load cell 200 disposed within a load cell cage 202. The load cell cage 202 may be configured to protect the load cell 200 from high stresses that may occur when rotating from the first position to the second position, thereby loading the load cell 200 only in the direction of the longitudinal axis 131 of the cylinder 130. As shown, the load cell cage 202 includes a first plate 204 disposed adjacent a first end of the load cell 200, and a second, substantially parallel, plate 206 disposed adjacent a second end of the load cell. Bolts 208 extend between the first and second plates 204 and 206, and are secured to the plates 204 and 206 using nuts 210. One or more cap screws 212 may be disposed on the load cell 200 and the load cell cage 202 may include additional plates 214 and 216 adjacent the first and second plates 204 and 206, respectively, as shown. A cylinder eye assembly 218 is coupled to the first plate 204, and is configured to be pivotably coupled to the linkages 194 of the load cell mounting assembly 192. Bolts 220 may be used to secure the second plate 206 to the second end of the barrel 132.

According to embodiments, the load cell assembly 152 may not include a load cell cage 202, in which case, the load cell 200 may be coupled (e.g., bolted) to the cylinder 130, and the cylinder eye assembly 218 may be coupled (e.g., bolted) to the load cell 200. Additionally, in embodiments, a load cell cage 202 may be used, but may be configured in a different manner than the configuration described herein. For example, different cage 202 configurations may be implemented to adapt to different vessel configurations, load cell configurations, base assembly configurations, and/or the like.

Figure 6A:
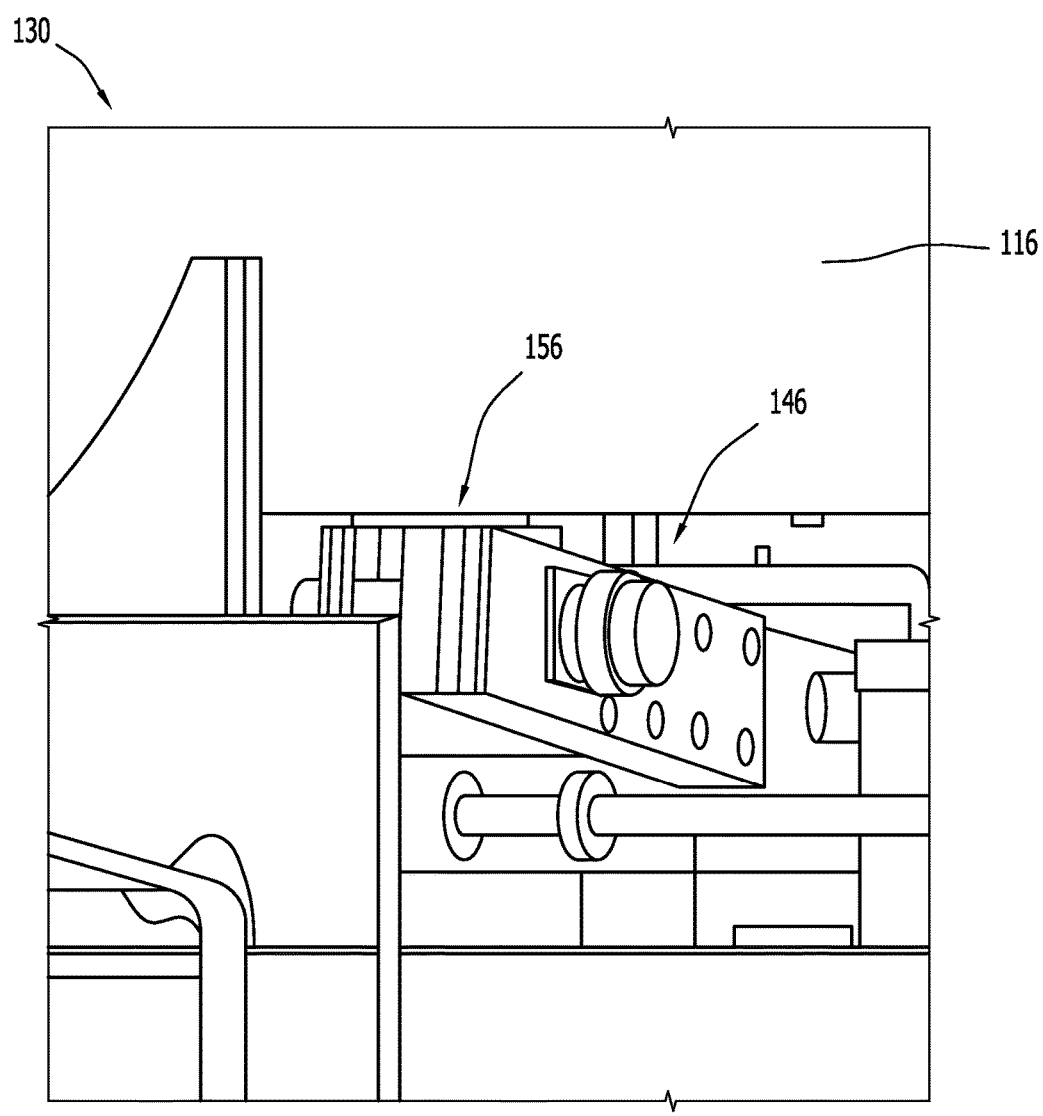
FIG. 6A is a perspective view of a pin locking assembly of the illustrative material and containment system depicted in FIG. 1A, in accordance with embodiments of the disclosure.
Figure 6B:
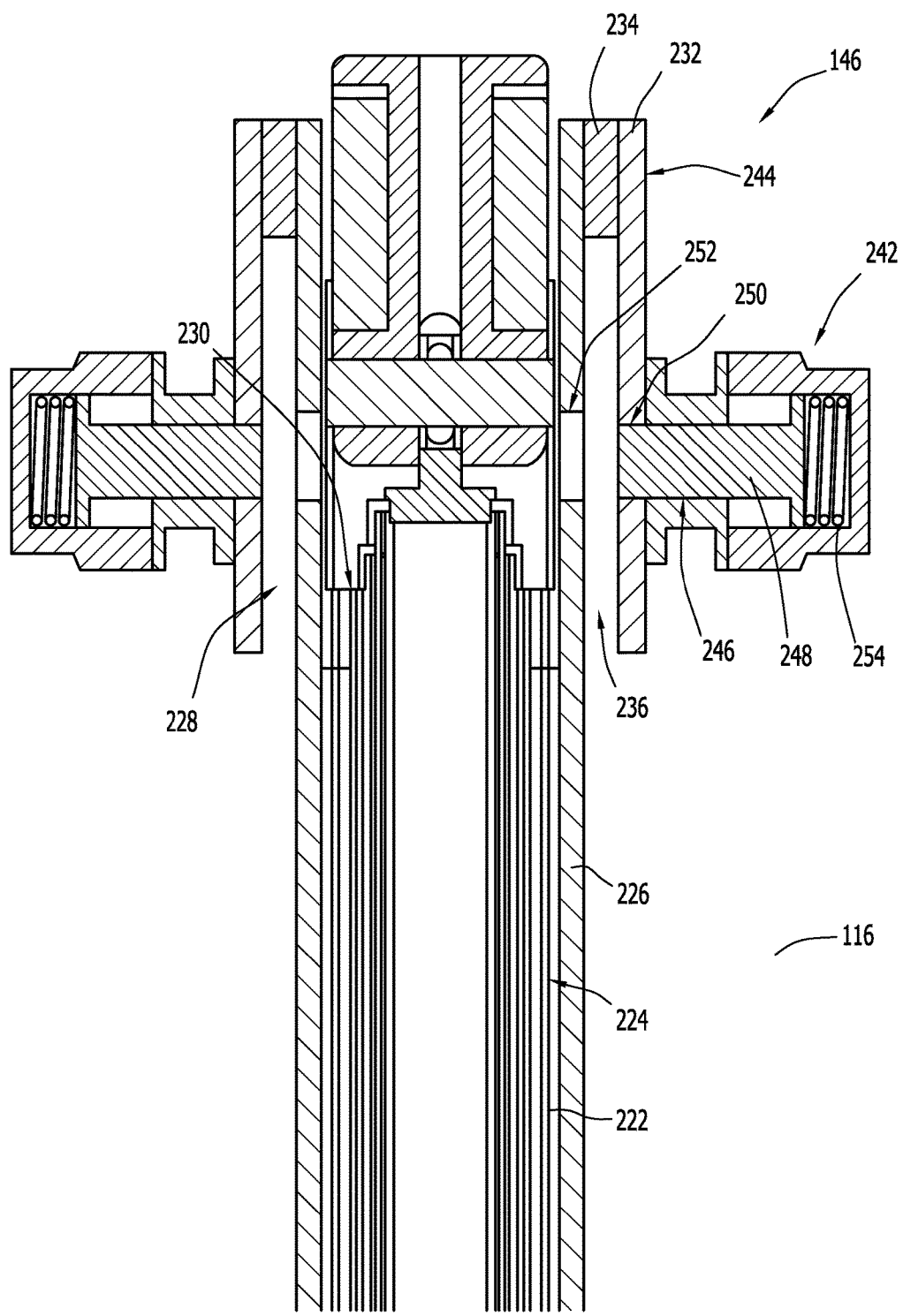
FIG. 6B is a cross-sectional view of a pin locking assembly of the illustrative material and containment system depicted in FIG. 1A, in accordance with embodiments of the disclosure.

FIGS. 6A-6D, 7A-7C, 8A-8C, 9A-9E, 10A-10E, and 11A-11B depict an exemplary operation of the system 100, in accordance with embodiments of the subject matter disclosed herein. FIGS. 6A-6C depict aspects of the system 100 in a first position, as described above and as depicted, for example, in FIG. 1A. As shown, the hydraulic cylinder 130 is in a compressed configuration, in which the pistons 134a, 134b, and 13c are not extended, or are minimally extended. The locking pin assembly 146 includes, on each side of the barrel 132 of the hydraulic cylinder, a mounting plate 222 secured to the external surface 224 of the barrel 132. An inner guide plate 226 is secured to the mounting plate 222 such that a portion 228 of the inner guide plate 226 extends beyond the end 230 of the barrel 132. An outer guide plate 232 is disposed substantially parallel to the inner guide plate 226 and coupled to the inner guide plate 226 by a spacer 234 such that a gap 236 is formed between the inner guide plate 226 and the outer guide plate 232. In embodiments, the spacer 234 may include a plate, a bar, and/or the like. The gap 236 is configured to receive a locking feature 148, which is fixed to the outside of the vessel having 116, and which has an aperture 240 defined therein.

In embodiments, the aperture 240 may be configured to have any number of different shapes such as, for example, circular, elliptical, egg-shaped, and/or the like. In embodiments, for example, a first portion of the aperture may be configured to include a bearing surface that engages the pin (and thus, for example, is just slightly larger than the pin), and may be configured to open up into a larger second portion such that the pin may easily slide into the second portion of the aperture and then engage the first portion of the aperture. In this manner, the pin may be easily set and may maintain a clean bearing surface with the aperture. According to embodiments, the locking pin assembly 146 may be mounted to the barrel 132 using any number of different types of mounting techniques, mechanisms, and/or the like.

The locking pin assembly 146 further includes a pin drive mechanism 242 coupled to an outside surface 244 of the outer guide plate 232. The pin drive mechanism 242 includes a pin chamber 246, and a pin 248 slidably disposed within the pin chamber 246. The pin drive mechanism 242 may be configured to drive the pin 248 through an aperture 250 defined in the outer guide plate 232, through the aperture 240 defined in the locking feature 148, and through an aperture 252 defined in the inner guide plate 226. In this manner, when the pin 248 is engaged, the vessel housing 116 is removably fixed to the barrel 132 of the hydraulic cylinder 130. According to embodiments, the locking pin assembly may include hydraulic components that may be temperature compensated such as, for example, by bleeding hydraulic cylinders and/the like.

As shown in FIG. 6B, the pin drive mechanism 242 may include a spring mechanism 254 configured to bias the pin 248 toward an engaged position, with a stop (not shown) that prevents the pin 248 from being deployed until the stop is disabled such as, for example, by actuation of a hydraulic mechanism, a mechanical mechanism, an electrical mechanism, and/or the like. In embodiments, a pin drive mechanism may include a positive hydraulic drive mechanism such as, for example, is depicted in FIG. 6D. As shown in FIG. 6C, a pin drive mechanism 256 having a positive hydraulic mechanism is shown, in accordance with embodiments of the disclosed subject matter. As shown, the pin drive mechanism 256 includes a pipe 258 having a pin 260 slidably disposed therein. The pipe 258 is coupled, at a first end 262, to an outside guide plate 264, aligned with an aperture 266 defined through the outside guide plate 264. A hydraulic drive cylinder 268 is coupled, via a coupler 270, to a second end of the pipe 258 and includes a piston 272 that engages the pin 260. Upon actuation of the hydraulic drive cylinder 268, the piston 272 pushes the pin 260 through the aperture 266.

Another example of one side of a locking pin assembly 274 is depicted in FIG. 6D. The locking pin assembly 274 includes, on each side of the barrel 132 of the hydraulic cylinder 130, one or more couplers 276 that are configured to secure an inner guide plate 278 to the barrel 132, via fasteners 277. A spacer 280 separates the inner guide plate 278 from a substantially parallel outer guide plate 282, thereby defining a gap 284 between the inner and outer guide plates 278 and 282. The gap 284 is configured to receive a locking feature 148 secured to the vessel. A side plate 286 extends between the inner and outer guide plates 278 and 282 along one side. A pin drive mechanism 288 is coupled to the outer guide plate 282 and configured to drive a locking pin (not shown) through an aperture (not shown) defined through the outer guide plate 282, an aperture defined through the protrusion, and an aperture 290 defined through the inner guide plate 278.

According to various embodiments, any number of other configurations of locking pin assemblies may be implemented. For example, a locking pin assembly may be configured to have a single pin, instead of two pins, that traverses an aperture or other receiving path defined across the diameter of the barrel of the hydraulic cylinder. In other embodiments, a locking pin assembly may include more than two pins, apertures that are defined within the barrel itself, and/or the like.

A locking pin assembly may also be configured to be adjusted for temperature compensation. That is, for example, the locking pin assembly 146 may be operated using the hydraulic system 128, which may drive the pin drive mechanism 242. Temperature sensors may be utilized, e.g., by a controller (which may be built into a computing device), to determine when the temperature of hydraulic fluid within the pin drive mechanism 242 has reached a level that will interfere with weight measurements and/or the function of the pin drive mechanism 242. In response, the controller may be configured to cause the pin drive mechanism 242 to bleed an appropriate amount of hydraulic fluid out, add an appropriate amount of hydraulic fluid, and/or otherwise adjust hydraulic pressure in the pin drive mechanism 242. In embodiments, temperature compensation associated with the locking pin assembly 146 may be achieved using actuators, control feedback loops, and/or the like.

Figure 7A:
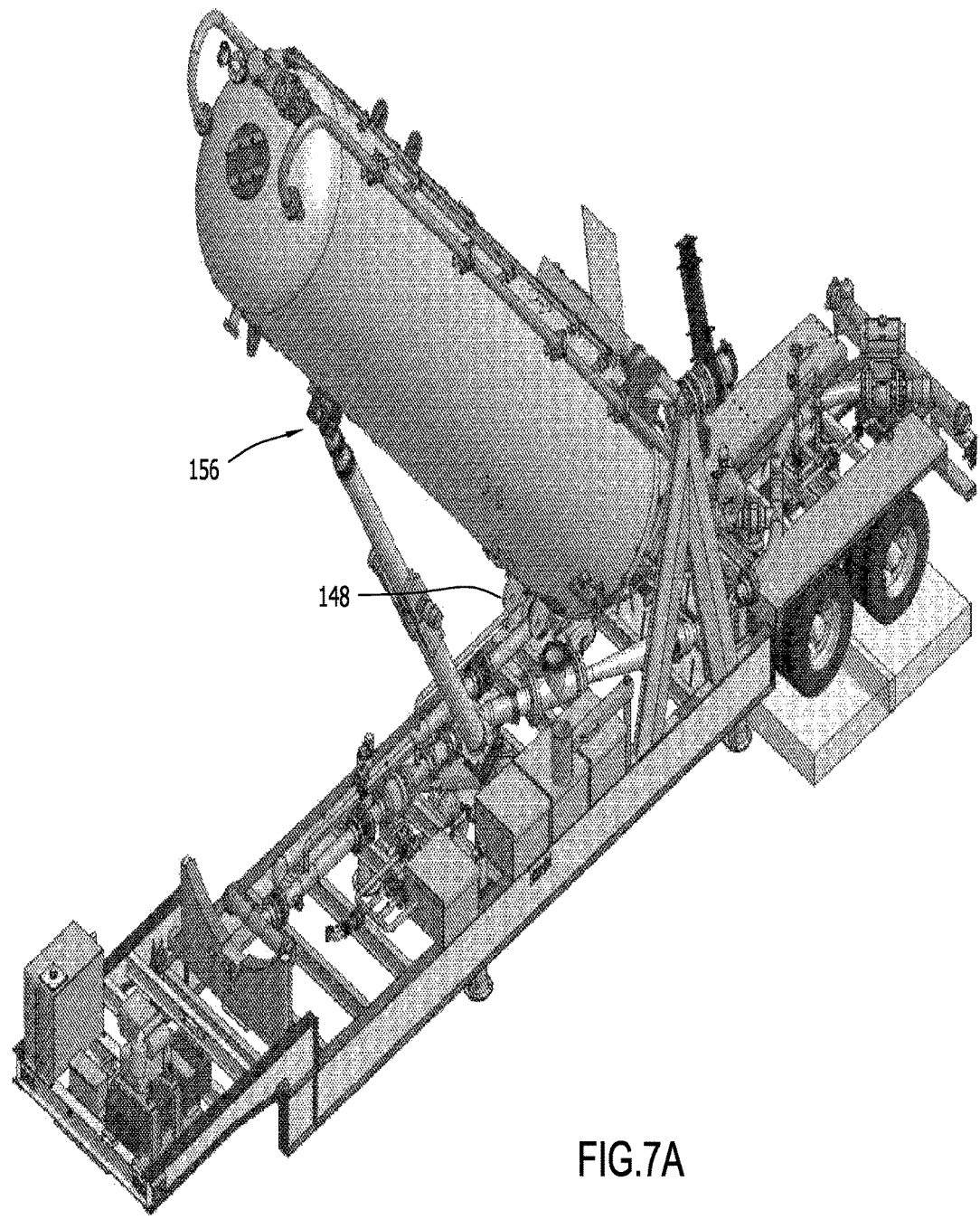
FIG. 7A is another perspective view of the illustrative material containment and delivery system depicted in FIG. 1A, in accordance with embodiments of the disclosure.
Figure 7B:
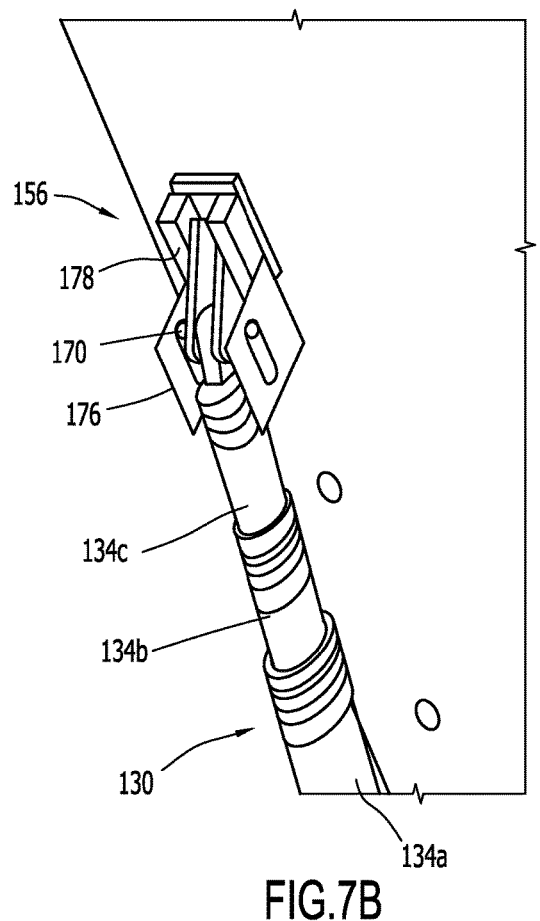
FIGS. 7B and 7C are perspective views of portions of the illustrative material containment and delivery system depicted in FIG. 1A, in accordance with embodiments of the disclosure.
Figure 7C:
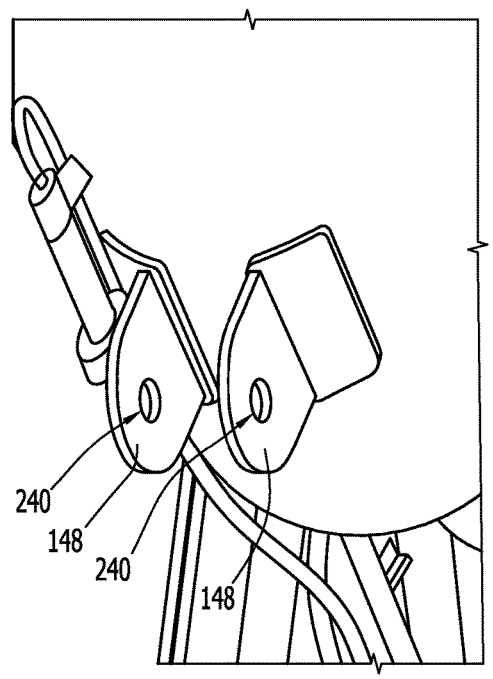
Figure 8A:
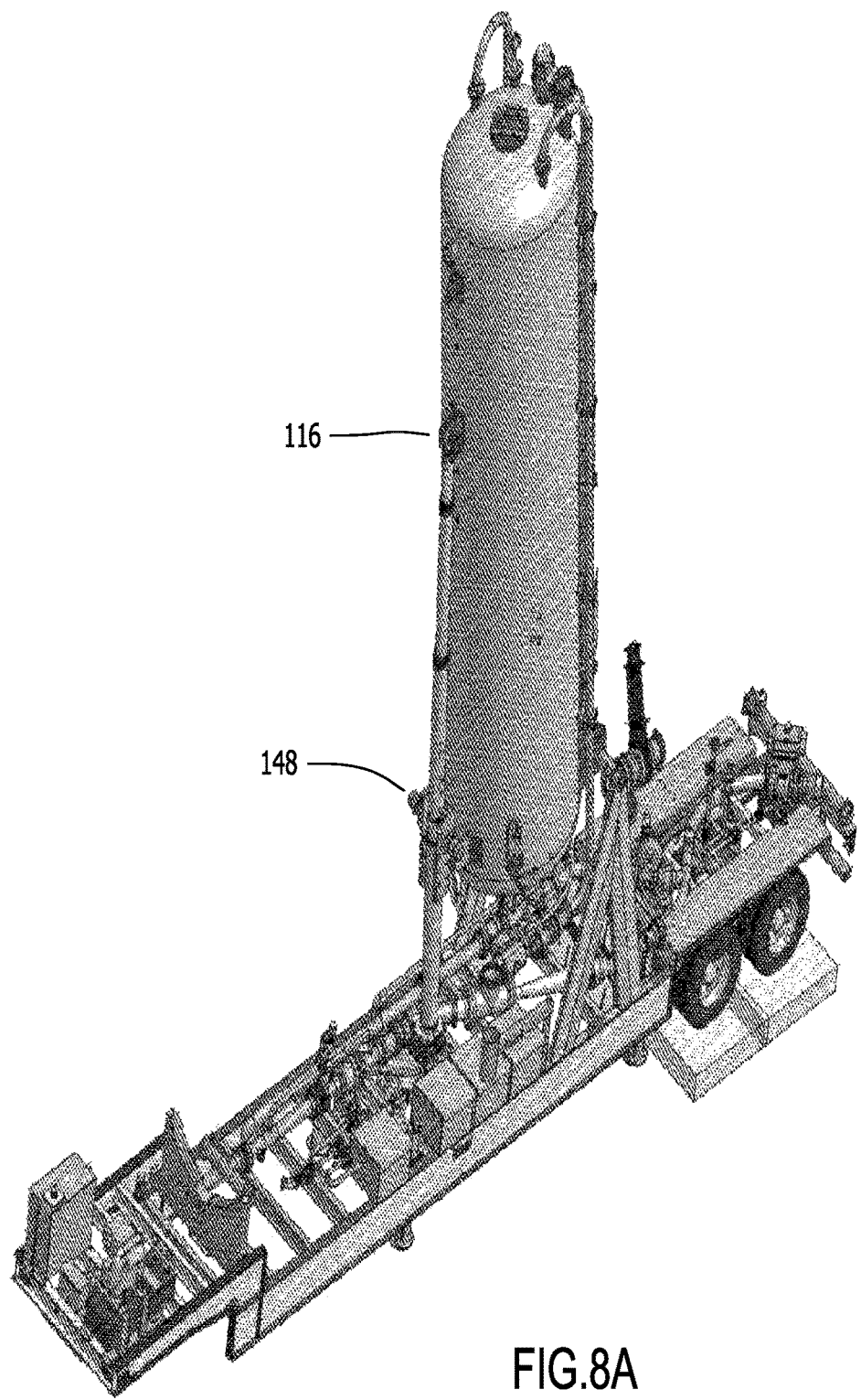
FIG. 8A is another perspective view of the illustrative material containment and delivery system depicted in FIG. 1A, in accordance with embodiments of the disclosure.
Figure 8B:
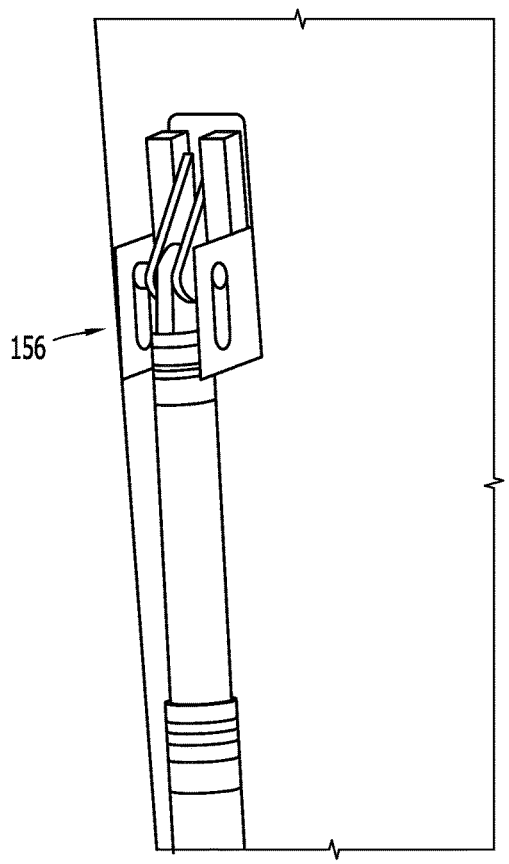
FIGS. 8B and 8C are perspective views of portions of the illustrative material containment and delivery system depicted in FIG. 1A, in accordance with embodiments of the disclosure.
Figure 8C:
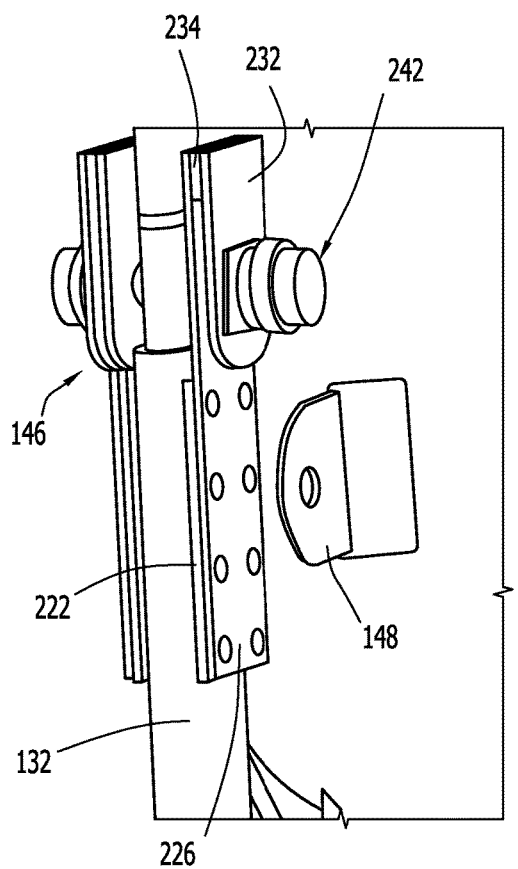
Figure 9A:
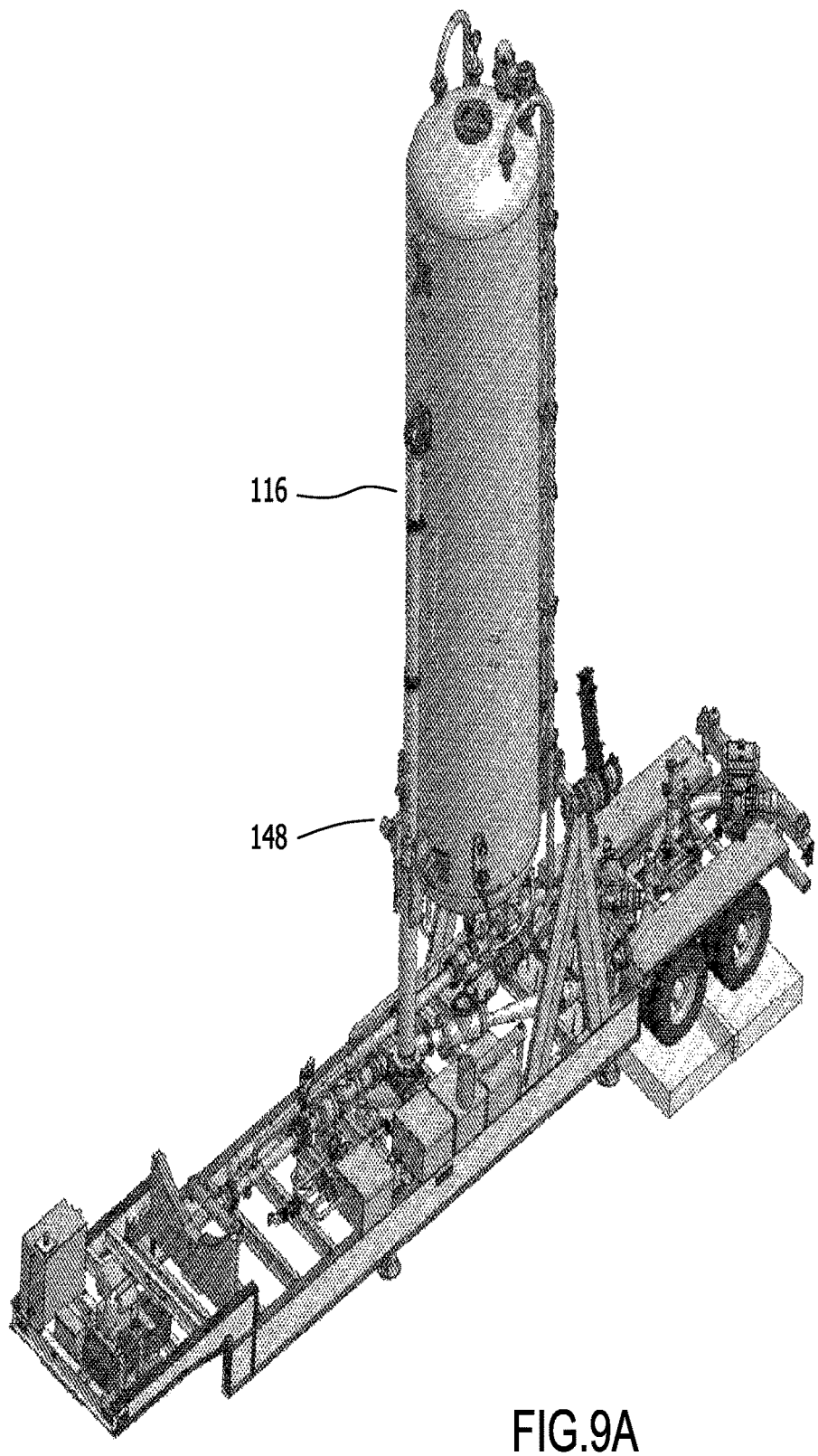
FIG. 9A is another perspective view of the illustrative material containment and delivery system depicted in FIG. 1A, in accordance with embodiments of the disclosure.
Figure 9B:
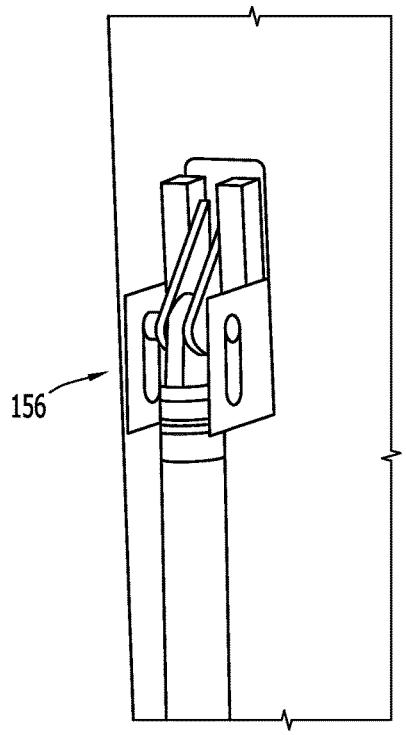
FIGS. 9B-9E are perspective views of portions of the illustrative material containment and delivery system depicted in FIG. 1A, in accordance with embodiments of the disclosure.
Figure 9D:
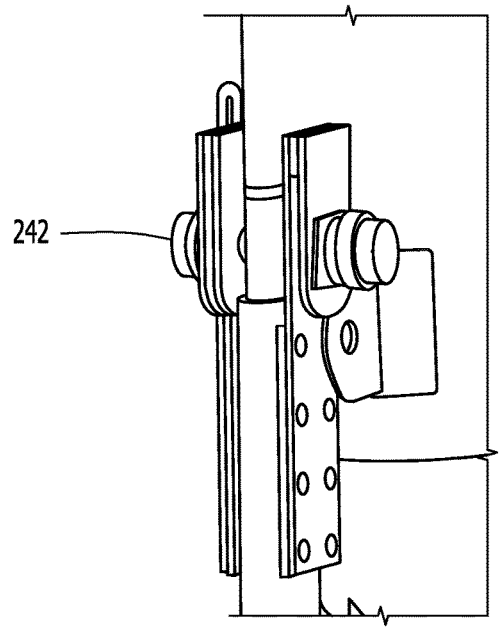
Figure 9C:
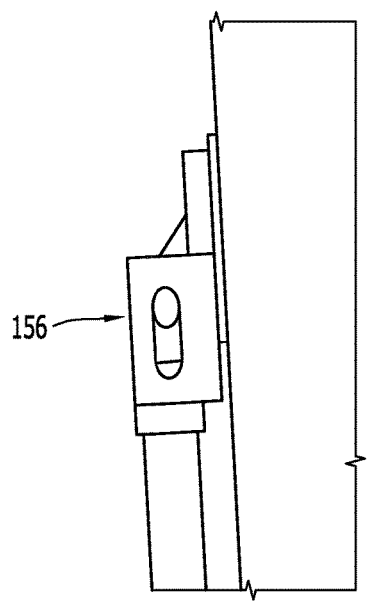
Figure 9E:
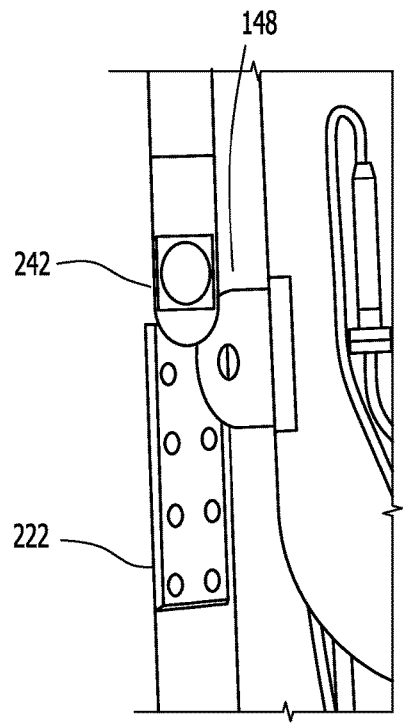
Figure 10A:
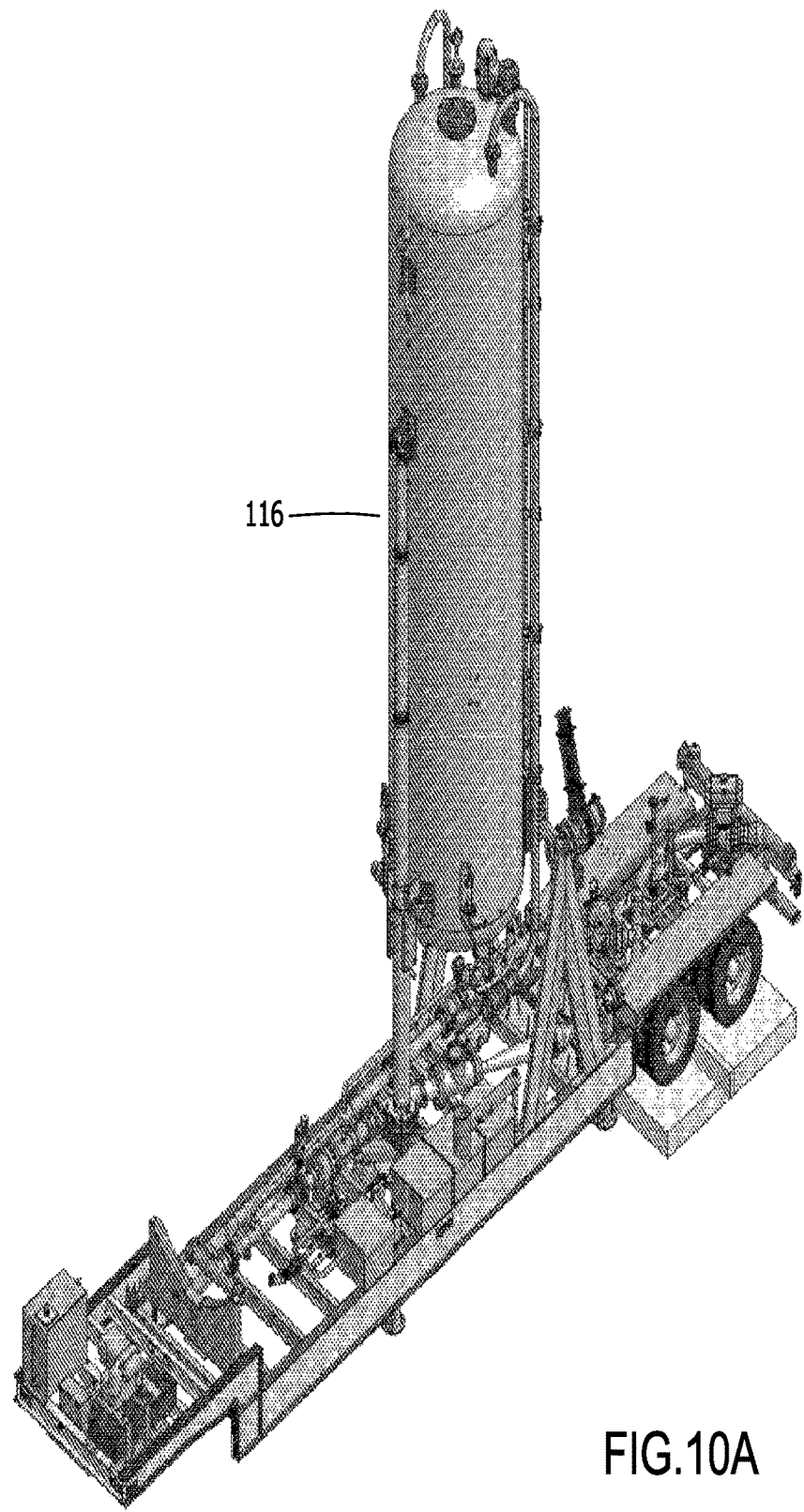
FIG. 10A is another perspective view of the illustrative material containment and delivery system depicted in FIG. 1A, in accordance with embodiments of the disclosure.
Figure 10B:
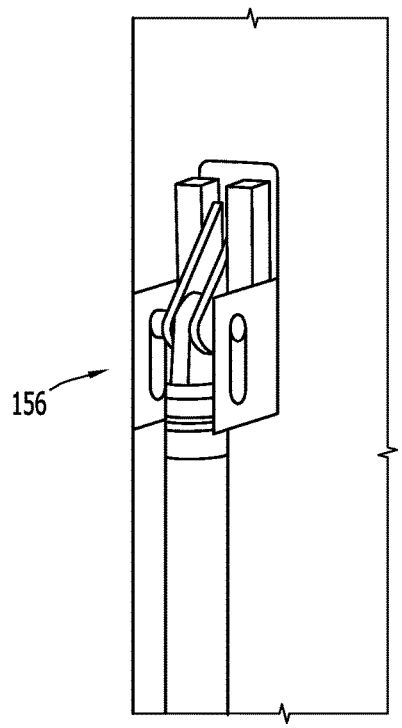
FIGS. 10B-10E are perspective views of portions of the illustrative material containment and delivery system depicted in FIG. 1A, in accordance with embodiments of the disclosure.
Figure 10D:
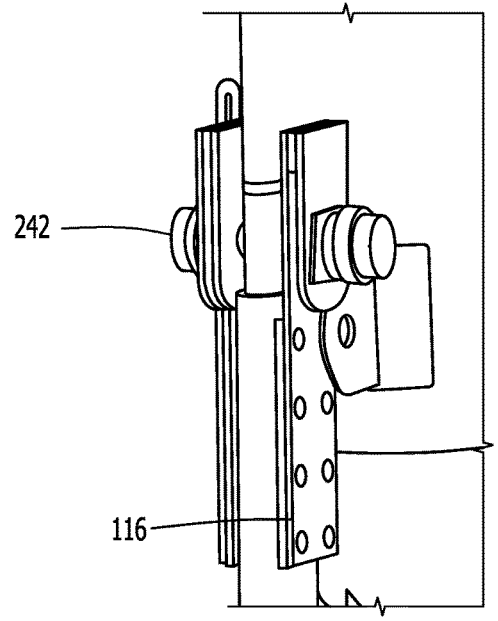
Figure 10C:
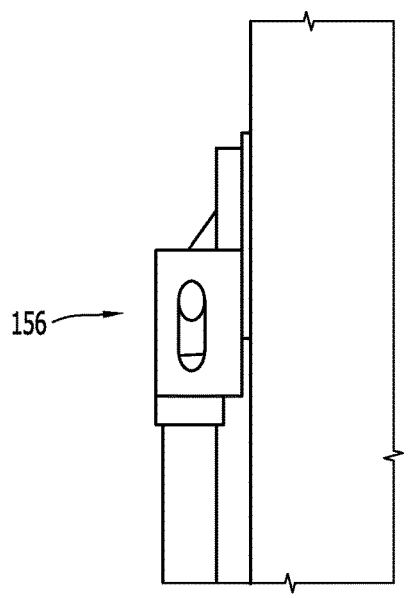
Figure 10E:
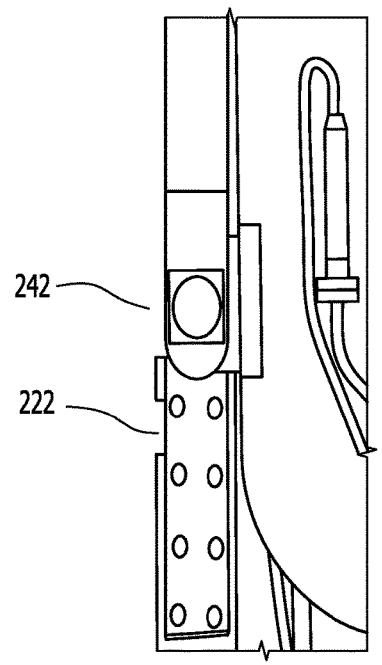
Figure 11A:
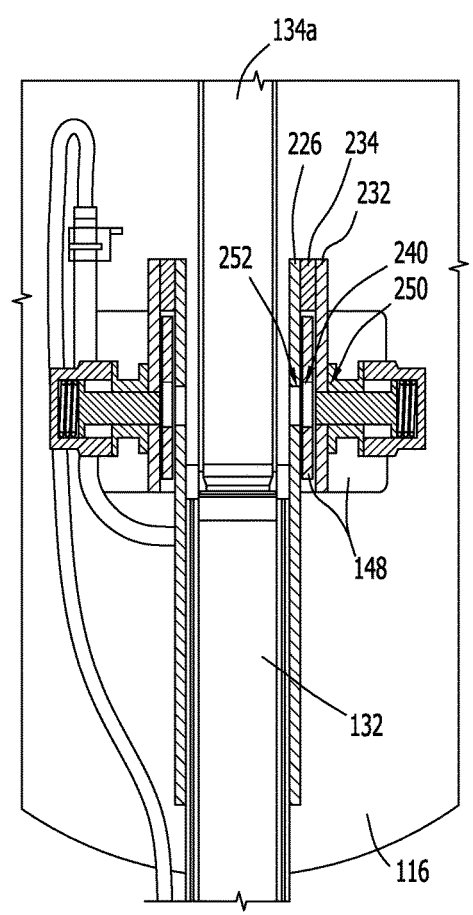
FIGS. 11A and 11B are side cross-sectional views of a pin locking mechanism of the illustrative material containment and delivery system depicted in FIG. 1A, in accordance with embodiments of the disclosure.
Figure 11B:
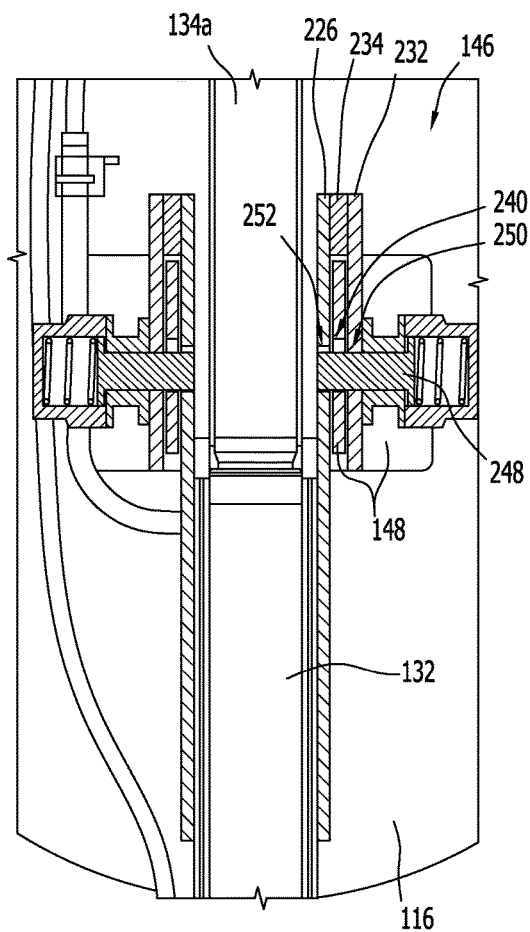

Continuing with reference to FIGS. 7A-7C, the vessel 114 is shown in an intermediate position, in which the lateral axis 122 of the vessel 114 is intersecting the lateral axis 126 of the base assembly 102 at approximately a 45 degree angle. In FIGS. 8A-8C, the vessel 114 is shown in another intermediate position, in which the lateral axis 122 of the vessel 114 is intersecting the lateral axis 126 of the base assembly at approximately an 80 degree angle. In FIGS. 9A-9E, the vessel 114 is shown in another intermediate position, in which the lateral axis 122 of the vessel 114 is intersecting the lateral axis 126 of the base assembly at approximately an 85 degree angle. In FIGS. 10A-10E, the vessel 114 is shown in another intermediate position, in which the lateral axis 122 of the vessel 114 is intersecting the lateral axis 126 of the base assembly at approximately a 90 degree angle. In FIGS. 11A and 11B, a cross-section of the locking pin assembly 146 is shown in an un-engaged configuration (FIG. 11A) and an engaged configuration (FIG. 11B).

FIGS. 8A-8C illustrates an example of a housing 116 in a substantially vertical position with an unengaged pin drive mechanism 242. As illustrated in FIG. 8C, the pin drive mechanism 242 has not engaged the locking feature or member 148.

FIGS. 9A-9E illustrates a housing 116 in a substantially vertical position with the pin drive mechanism 242 positioned to engaged in the locking features 148. As illustrated, the locking feature or member 148 is positioned for the pin drive mechanism 242 to engage with the locking feature or member 148.

FIGS. 10A-10E illustrates an example of a housing 116 in a substantially vertical position with an engaged pin drive mechanism 242. As illustrated, the locking mechanism 242 is engaged with the locking feature or member 148.

According to embodiments, one or more aspects of the system 100 described herein may include any number of sensors, detectors, transducers, and/or the like that may be used to monitor and/or control operation of at least a portion of the system 100. For example, such components may facilitate monitoring the position of the vessel 114, whether the locking pin mechanism has been engaged, and/or the like. Any number of various monitoring and/or control procedures may be performed using one or more computing devices with may be local or remote, with respect to the system 100. For example, in embodiments, a processor, microprocessor, and/or the like may be used to calculate a weight of a load in the vessel based on the force applied to the load cell. The calculation of the weight may be performed by considering the geometry of the vessel support (e.g., the number of load cells and their locations, the angle of the hydraulic cylinder with respect to a normal plane of the load cell or the horizontal, the number of pivot points by which the vessel is secured, and/or the like).

While embodiments of the subject matter disclosed herein are described with specificity, the description itself is not intended to limit the scope of this patent. Thus, the inventors have contemplated that the claimed subject matter might also be embodied in other ways, to include different steps or features, or combinations of steps or features similar to the ones described in this document, in conjunction with other technologies. For example, other mechanical and control components and may be used to move, hold and use the structures as noted above.

In embodiments, for example, a material containment system may include a positionable vessel and a positioning assembly that is configured to move the vessel from a first position to a second position, where the positioning assembly is not in the load path. That is, for example, the positioning assembly may include a hydraulic system (such as the hydraulic system 128 described above) configured to move the vessel from the first position to the second position. When the vessel is in, or near, the second position, a separate support leg having a load cell coupled to a lower end may be positioned to engage the vessel. The support leg may support the vessel such that the vessel may be released from the hydraulic system (or otherwise supported, at least in part, by the support leg so that the positioning assembly is removed from the load path).

In embodiments, such a support leg may include one or more legs, members, linkages, and/or other structures configured to at least partially support the vessel and form part of the load path. The support leg may be positioned into the load path by lifting, rotating, or otherwise moving it from a first support leg position to a second support leg position. In this manner, one or more load cells may be utilized without including them within the positioning assembly.

What is claimed:

1. A material containment and delivery system, comprising:
    a base assembly, the base assembly having a lateral axis;
    a vessel comprising a housing configured to contain a material, the housing comprising a first end, a second end, and a lateral axis extending from the first end to the second end, wherein the vessel is coupled to the base assembly;
    a positioning assembly configured to move the vessel from a first position to a second position, wherein the first position comprises a position in which the lateral axis of the vessel is substantially parallel to the lateral axis of the base assembly; and
    a load cell disposed between the positioning assembly and the base assembly or under a support leg, wherein the load cell is configured to measure a weight of material within the vessel when the lateral axis of the base assembly intersects the lateral axis of the vessel.

2. A material containment and delivery system, comprising:
    a base assembly, the base assembly having a lateral axis;
    a vessel comprising a housing configured to contain a material, the housing comprising a first end, a second end, and a lateral axis extending from the first end to the second end, wherein the vessel is coupled to the base assembly;

a positioning assembly configured to move the vessel from a first position to a second position, wherein the first position comprises a position in which the lateral axis of the vessel is substantially parallel to the lateral axis of the base assembly; and a load cell disposed between the positioning assembly and the base assembly, wherein the load cell assembly is configured to measure a weight of material within the vessel when the lateral axis of the base assembly intersects the lateral axis of the vessel.

3. The system of claim 2, wherein the base assembly is configured to be coupled to a vehicle.

4. The system of claim 2, wherein the base assembly is coupled to a towable trailer.

5. The system of claim 2, wherein the positioning assembly comprises a hydraulic cylinder having a barrel and at least one piston slidably disposed within the barrel.

6. The system of claim 5, the at least one piston comprising an inner piston having a first end slidably disposed within an intermediate piston, and a second end pivotably coupled to a connection assembly disposed on the vessel housing.

7. The system of claim 6, wherein the vessel is coupled to the base assembly at the first end, and the second end of the inner piston is pivotably coupled to the connection assembly disposed on the vessel housing.

8. The system of claim 2, wherein the positioning assembly further comprises a locking pin assembly coupled to a barrel, the locking pin assembly configured to releasably engage a locking member disposed on the vessel housing.

9. The system of claim 2, wherein the positioning assembly is configured to rotate or pivot the vessel from the first position to the second position.

10. The system of claim 2, wherein the second position comprises a position in which the lateral axis of the vessel intersects the lateral axis of the base assembly.

11. The system of claim 2, wherein the second position comprises a position in which the lateral axis of the vessel is substantially perpendicular to the lateral axis of the base assembly.

12. The system of claim 2, wherein the vessel is coupled to the base assembly near the second end or near the center of the vessel.

* * * * *